Nov. 7, 1950 J. SAMSON 2,528,555
FLOOR LAMP GUIDE LIGHT
Filed Aug. 9, 1948
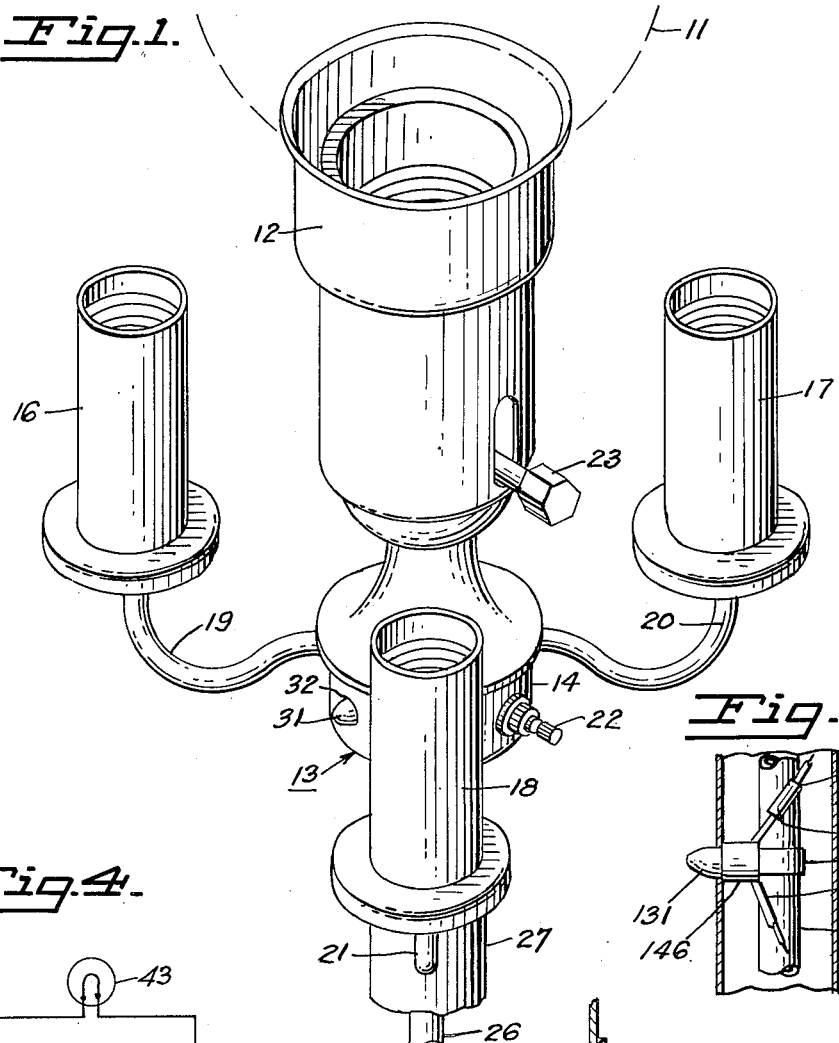
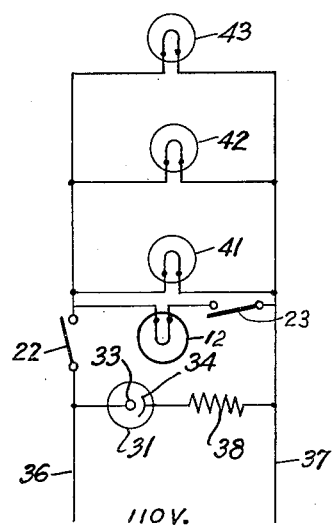
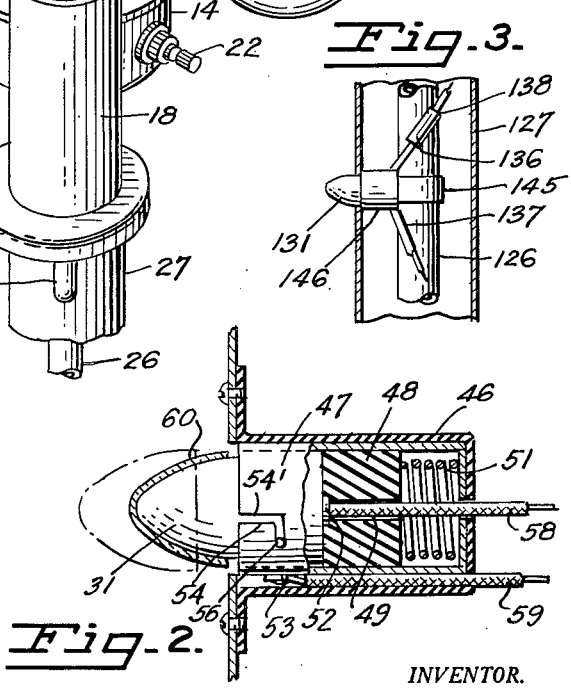
INVENTOR.
JOSEPH SAMSON
BY Arlington White
ATTORNEY.

Patented Nov. 7, 1950

2,528,555

UNITED STATES PATENT OFFICE 2,528,555

FLOOR LAMP GUIDE LIGHT

Joseph Samson, San Francisco, Calif., assignor to himself and Harvey Masonek, San Francisco, Calif., jointly Application August 9, 1948, Serial No. 43,332

2 Claims. (Cl. 240—81)

The invention, in general, relates to the art of illumination and more particularly relates to floor lamp construction and associated light circuit.

While not directly related or analogous to the present invention, there have been, heretofore, developments in various types of floor lamp structures with so-called "night lights" which, in general, utilize incandescent lamps for the desired night light. A majority of the more recently marketed floor lamps incorporating the night light feature employ some type of luminous surface, such as "tenite," onyx or other like surface, in conjunction with a lamp or bulb of relatively high wattage. All such prior structures require a second or auxiliary switch that controls the night light independently of the main lamps which are regulated and controlled by the main switch of the floor lamp. In addition to the increased manufacturing costs involved in the provision of these prior night light types of floor lamps, the prior structures have many disadvantages including the generation of appreciable heat which creates a fire hazard, as well as too intense illumination to the discomfort and annoyance of other occupants of the room desirous of sleeping. Moreover, the night light feature is restricted to floor lamp construction embodying "tenite," onyx or like luminous surface for effecting reflection. The present invention, essentially, is directed to the provision of a floor lamp guide light assembly enabling not only the ready location in a dark room or space of the floor lamp per se, but of the main switch thereof and, moreover, obviates the many disadvantages of prior floor lamp structures including those specifically referred to hereinabove.

A primary object of the present invention is to provide an improved floor lamp guide light affording positive directional or locational lighting at all times in a structure that does not detract from the appearance of the room in which it is disposed.

Another important object of my invention is to provide a floor lamp guide light of the indicated nature which is additionally characterized by its adaptability to all types of floor lamps, which can be manufactured inexpensively, and which requires a minimum of expense to maintain.

A still further object of the invention is to provide an improved floor lamp guide light of the aforementioned character which is durable and which can be employed for appreciably longer periods of time, and which can be used without discomfort or annoyance to other occupants of a room in which the lamp is placed.

Other objects of the invention, together with some of the advantageous features thereof, will appear from the following description of a preferred and a modified embodiment of the invention which are illustrated in the accompanying drawings. It is to be understood that I am not to be limited to the precise embodiments shown, nor to the precise arrangement of the various parts thereof, as my invention, as defined in the appended claims, can be embodied in a plurality and variety of forms.

Referring to the drawings:

Fig. 1 is a fragmentary perspective view of a preferred embodiment of the invention.

Fig. 2 is an enlarged detail illustrating a mounting means for a principal element of the preferred embodiment of the invention.

Fig. 3 is a fragmentary elevational view of a modified embodiment of the invention.

Fig. 4 is a schematic wiring diagram of the electrical circuit embodied in the preferred and modified embodiments of the invention.

In its preferred form, the improved floor lamp guide light of the present invention preferably comprises a hollow member of a floor lamp structure, said member having an opening therein, a neon bulb nested within said hollow member and protruding through said opening, together with an energized electrical circuit for the lamp containing said neon bulb which is constantly energized.

A typical upper assembly of a conventional floor lamp structure is depicted in Fig. 1 of the annexed drawings which exemplifies a preferred embodiment of the present invention. This assembly includes a reflector bowl 11 mounted on a "mogul" socket 12 which is integral with a cluster, designated generally by the reference numeral 13, consisting of a central hollow member 14 and a plurality of socket holders 16, 17 and 18 joined to the member 14 by means of hollow stems 19, 20 and 21, respectively. The central hollow member 14 of the cluster 13 serves as a nesting chamber or housing for collected portions of various electrical conduits which serve the various sockets of the floor lamp, including the "mogul" socket 12, and the hollow member 14 also serves as a mounting for a main switch actuated by the knob 22. A three-way "mogul" switch, actuated by knob 23, is mounted as is customary on the mogul socket 12 for regulating the intensity of the light emanating from a lamp, not shown, fitted to the "mogul" socket.

While not shown in the fragmentary view of Fig. 1 of the accompanying drawings, the cluster 13 is detachably secured as a unit to a standard 26, usually by threaded engagement therewith which is housed in a tubing 27. A floor lamp base, not shown, receives the lower threaded end of the standard 26 in a central, internally threaded socket, also not shown, of the base. It is to be understood that the showing of Fig. 1 is solely for purposes of an explanation of the present improvement, as exemplified in a typical floor lamp assembly, and that my invention is entirely suitable for adaptation in substantially all types of floor lamp structures regardless of variations in lamp element assemblies.

In accordance with my invention, a neon bulb 31, preferably of approximately 1/25 watt capacity, is mounted on the central hollow member 14 of the cluster 13 of the floor lamp, and connected into the main electrical circuit, see Fig. 4, for the lamp as hereinafter explained. The mounting of the neon bulb 31 on member 14 of the cluster is such that a major portion of the bulb lies within the cluster or hollow interior of the member 14 thereof but a portion of the bulb 31 protrudes externally thereof through an opening 32 formed in the member 14. The location of opening 32 in member 14 is not critical although for practical purposes such opening should be in close proximity to the main lamp switch knob 22 of the floor lamp so that the knob can be more readily located by the hand. Electrodes 33 and 34 of the neon bulb, see Fig. 4 of the annexed drawings, are connected across electrical conductors 36 and 37 of an electrical circuit including a source of alternating current, a floor outlet, a standard floor plug, all not shown, with conductors 36 and 37 connected to the floor plug. To regulate the voltage and current through neon bulb 31, an approximately 200,000 ohm resistor 38 is connected in series with the neon bulb across conductors 36 and 37. Under this arrangement, the neon bulb 31 remains constantly energized during supply of alternating current and with the floor plug connected into the floor outlet of the alternating current circuit, regardless of actuation of main floor lamp switch 22, and "mogul" switch 23. Under normal conditions of operation, the neon bulb 31 will have a life of approximately 25,000 hours before it need be replaced. A wiring diagram of a portion of the electrical circuit employed in both modifications is shown in Fig. 4, omitting the floor outlet and floor plug as well as omitting the "mogul" three-way switch 23 and the lamp of the "mogul" socket 12. As shown, the main lamp switch 22 is energized and de-energized independently for lighting and shutting off lamps 41, 42 and 43 contained in the sockets of socket holders 16, 17 and 18, respectively, such switch 22 not in any way controlling the energization of neon bulb 31 since the latter is constantly energized directly from the alternating current source and remains lighted while the main circuit is closed.

In Fig. 2 of the accompanying drawings, I have depicted in enlarged detail typical mounting means for the neon bulb 31 on the cluster 13 of the floor lamp, such mounting means being merely suggestive. As shown, I provide a flanged tube 46 of electrical insulation material, such as "bakelite," which removably receives a metal sleeve 47 of electrically conductive material and in which is slidably mounted a contact block 48 having a central bore therein, designated by the reference numeral 49. The block 48 seats upon a spring 51 disposed between the end of sleeve 47 and the bottom of the block 48, as shown, the spring 51 urging the block outwardly. A contact 52 is embedded in the outer face of block 48 and another contact 53 is secured to the outside of the sleeve 47. The sleeve 47 is formed with a pair of diametrically opposed right angle slots 54 for passing the pins 56 carried on the metal base of the bulb 31, as shown in full and dotted lines in Fig. 2 of the drawings. The full line showing of neon bulb 31 depicts the bulb in fixed, operative position with the pins 56 thereof held in the slots 54 of the sleeve 47. Whenever it is desired to remove the bulb 31, it is first rotated slightly to bring the pins 56 into legs 54' of the slots 54, and the bulb 31 may then be withdrawn from the mounting means. To seat the bulb in operative position, the pins 56 on the base of the bulb are first aligned with legs 54' of the slots 54 of the sleeve 47 and the bulb then moved into the sleeve to bear on the contact block 48, thereby compressing the spring 51 so that the pins 56 can clear legs 54' of the slots 54, whereafter by a slight rotation of the bulb 31 the pins 56 thereof are brought into the other legs of slots 54, as shown. The bulb 31 is then released and will stay secured in its mounting means, with the block 48 pressed against the base of the bulb under the tension or influence of spring 51. Suitable small screws 57 are provided for securing the flanges of tube 46 and the tube itself to the hollow member 14 of the cluster 13 of the floor lamp. Electrical conductors 58 and 59 are connected to the contacts 52 and 53, respectively, on the contact block 48 and sleeve 47; suitable openings being formed in the sleeve and tube 46 for passing such conductors which are, in turn, connected to the cord of the floor plug, not shown, to connect the electrodes of the bulb 31 into the electrical circuit. The resistor 38, above mentioned, is of course also connected into this circuit, although not shown in Fig. 2.

In order to decrease the intensity of the light emanating from bulb 31 to an extent desired, as well as to afford any desired color of light, I provide a translucent cap 60 for the protruding dome portion of bulb 31, the cap easily being held on such dome portion after it is slipped thereover and the cap, as stated above, being of any desired color to afford a desired colored light from the neon bulb 31.

A modified embodiment of the present invention is illustrated in Fig. 3 of the drawings wherein I have depicted, in fragmentary view, a conventional upright or standard 126 of the usual floor lamp structure which is housed within a hollow member or tubing 127 of the conventional floor lamp. It is to be understood, of course, that the upright or standard 126 is threaded at its top and bottom for removably mounting a cluster or other element on the top of the upright, and for removably fitting the standard to a base, not shown. The tubing or hollow member 127 is, in effect, a conduit for passing the electrical conductors leading from a source of electrical energy to the sockets, not shown, in which lamps are fitted. In accordance with this modification, a neon bulb 131, which is in all respects similar to the neon bulb 31 of the preferred embodiment of the invention, is removably mounted on and partially nested within the hollow member 127 by means of suitable mounting elements including a tube 146 with the nose or dome portion of the neon bulb extending externally of tubing 127 through an opening 132 formed therein. The electrodes of the neon bulb 131 are connected across electrical leads 136 and 137 of the alternating current circuit supplying the lamp, and an approximately 200,000 ohm resistor 138 is interposed in the circuit in series with bulb 131. In this modification, I preferably form the mounting tube 146 with a pair of arcuate extensions 145 which encircle the standard 126 partially and serve as clips for securing the tube 146 in position and for holding the same, together with neon bulb 131 firmly in operative position; the arcuate extensions 145 being of spring metal or the like and therefore being adapted to be readily slipped over and withdrawn directly from the standard 126.

It is to be understood that the appended claims are to be accorded a range of equivalents commensurate in scope with the advance made over the prior art.

I claim:

1. A floor lamp guide light comprising, in combination, a floor lamp structure including a vertically disposed tubing having an inlet, an outlet and an opening through the wall thereof, a vertically disposed standard housed within said tubing and spaced from the wall thereof, electrical conductors housed in said tubing and leading from the inlet through the outlet thereof for conducting electrical energy to the globes of the floor lamp, a neon bulb connected across said conductors for constant energization independently of the energization of the lamp globes, and means including at least one clip partially encircling said standard for removably mounting said bulb on said tubing with a portion of the bulb extending externally of the tubing through said opening.

2. A floor lamp guide light comprising, in combination, a floor lamp structure including a vertically disposed tubing having an inlet, an outlet, and an opening through the wall thereof, electrical conductors housed in said tubing and leading through said inlet and extending from said outlet for conducting electrical energy to the globes of the lamp, a sleeve secured within said tubing, a neon bulb removably mounted in said sleeve and extending externally of said tubing through said opening, and means connecting the electrodes of said neon bulb across said electrical conductors for effecting constant energization of said bulb independent of the energization of the globes of the lamp.

JOSEPH SAMSON.

REFERENCES CITED

The following references are of record in the file of this patent:

UNITED STATES PATENTS

| Number | Name | Date |
| --- | --- | --- |
| 2,012,413 | Winkler | Aug. 27, 1935 |
| 2,015,724 | Meyer | Oct. 1, 1935 |
| 2,445,079 | Petersdorf | July 13, 1948 |